United States Patent [19]

Okitsu et al.

[11] Patent Number: 5,310,830

[45] Date of Patent: May 10, 1994

[54] EPOXY RESIN, MALEIMIDE AND OH- AND EPOXY-CONTAINING COMPOUND

[75] Inventors: Toshinao Okitsu; Shinichi Sato, both of Tokyo, Japan

[73] Assignee: Konishi Co., Ltd., Osaka, Japan

[21] Appl. No.: 978,026

[22] Filed: Nov. 18, 1992

Related U.S. Application Data

[63] Continuation of Ser. No. 545,468, Jun. 28, 1990, abandoned.

[51] Int. Cl.$^5$ .................. C08L 63/02; C08L 63/04; C08L 79/08
[52] U.S. Cl. .................. 525/502; 525/486; 525/525; 525/526; 525/529; 525/530
[58] Field of Search .................. 525/530, 502

[56] References Cited

U.S. PATENT DOCUMENTS

| | | | |
|---|---|---|---|
| 4,288,359 | 9/1981 | Graham | 525/530 |
| 4,465,722 | 8/1984 | Fiaux et al. | 528/104 |
| 4,691,025 | 9/1987 | Domeier et al. | 548/521 |
| 4,743,647 | 5/1988 | Domeier | 524/516 |
| 4,810,535 | 3/1989 | McCollum et al. | 528/103 |
| 4,816,531 | 3/1989 | Young | 525/488 |
| 4,837,295 | 6/1989 | Drain et al. | 528/111 |
| 4,886,842 | 12/1989 | Drain et al. | 522/103 |
| 4,963,291 | 10/1990 | Bercaw | 524/441 |
| 4,977,218 | 12/1990 | Gardner et al. | 525/329.3 |
| 5,006,381 | 4/1991 | Nugent, Jr. et al. | 525/523 |
| 5,082,880 | 1/1992 | Kitahara et al. | 523/466 |

*Primary Examiner*—Robert E. Sellers
*Attorney, Agent, or Firm*—Frishauf, Holtz, Goodman & Woodward

[57] ABSTRACT

Disclosed is a heat-resistant resin composition prepared by mixing a resin composition (A) and polyamine (B), followed by heating the mixture for the hardening, said composition (A) being prepared by heating a mixture of (a) polymaleimide resin represented by a general formula:

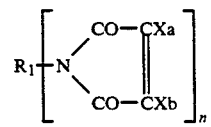

where $R_1$ is an organic group having a valency of n, Xa and Xb are the same or different monovalent atoms or groups selected from the group consisting of hydrogen atom, halogen atom and organic group, and n is an integer of 1 to 4, (b) an epoxy resin having at least two epoxy groups in the molecule, and (c) a compound having one alcoholic or phenolic OH group and at least one epoxy group in the molecule.

19 Claims, No Drawings

EPOXY RESIN, MALEIMIDE AND OH- AND EPOXY-CONTAINING COMPOUND

This application is a continuation of application Ser. No. 07/545,468, filed Jun. 28, 1990 (abandoned).

BACKGROUND OF THE INVENTION

1. Field of the Invention

The present invention relates to a thermosetting, solventless, liquid heat-resistant resin composition, high in storage stability and excellent in workability.

2. Description of the Related Art

Recently, various materials are used under severer conditions in electrical and electronic equipments as well as in mechanical equipments. Naturally, severer demands are directed to the heat-resisting property of a resin component used as, for example, an adhesive.

Aminobismaleimide, which is an addition reaction product between N,N'-bismaleimide and diamine, is known as such a heat-resistant resin. The known heat-resistant resin noted above, however, is defective in that a long heat treatment at high temperatures is required for the curing. To overcome the defect, various measures have been proposed to date. For example, it is proposed to add an epoxy resin in order to improve the curing property, adhesive property, etc. of aminobismaleimide, though the heat-resisting property of aminobismaleimide may be somewhat impaired by the epoxy resin addition.

It is also proposed to subject polymaleimide, polyamine and epoxy resin to a solution reaction or a bulk reaction, followed by dissolving the reaction product in a solvent. The resultant resin is certainly excellent in viscosity stability at a low temperature, e.g., 5° C. However, where the resultant resin is cured after storage over a long period of time, the resin fails to exhibit an initial strength in the heating step, making it necessary to preserve the resin under very low temperatures or under a B stage (semi-curing). Further, it is very difficult to make the above-noted three components solventless.

SUMMARY OF THE INVENTION

The present invention is intended to overcome the above-noted defects inherent in the prior art, and provides a two-part, solventless, liquid heat-resistant resin composition exhibiting a high storage stability and soluble in a general purpose solvent.

According to the present invention, there is provided a heat-resistant resin composition prepared by mixing a resin composition (A) and polyamine (B), followed by heating the mixture for the curing, said composition (A) being prepared by heating a mixture of (a) polymaleimide resin represented by a general formula:

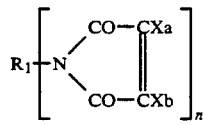

where $R_1$ is an organic group having a valency of n, Xa and Xb are the same or different monovalent atoms or groups selected from the group consisting of hydrogen atom, halogen atom and organic group, and n is an integer of 1 to 4, (b) an epoxy resin having at least two epoxy groups in the molecule, and (c) a compound having one alcoholic or phenolic OH group and at least one epoxy group in the molecule.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

The resin composition (A) used for preparing the heat-resisting resin composition of the present invention contains component (a) of polymaleimide. The polymaleimide used in the present invention includes, for example, hexamethylene bismaleimide, 4,4'-diphenylether bismaleimide, m- or p-phenylene bismaleimide, 4,4'-dicyclohexyl methane bismaleimide, 4,4'-diphenylene bismaleimide, 4,4'-diphenylsulfone bismaleimide, m- or p-xylylene bismaleimide, 4,4'-diphenylmethane bismaleimide, trinuclides thereof and tetranuclides thereof. These bismaleimide compounds can be used singly or in combination.

The resin composition (A) also contains component (b) of epoxy resin. The epoxy resin used in the present invention includes, for example, bisphenol A epoxy resin, bisphenol F epoxy resin, novolak epoxy resin, epoxy resin consisting of the glycidylated amine, polyglycidyl ether of polyol, epoxy resin having a heterocyclic ring, and aliphatic or alicyclic epoxy resin. These epoxy resins can be used singly or in combination.

Further, the resin composition (A) contains component (c) of a compound having one alcoholic or phenolic OH group and at least one epoxy group in the molecule. Component (c) noted above includes, for example,

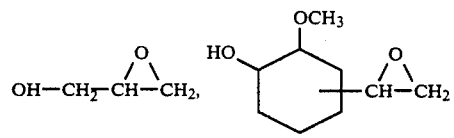

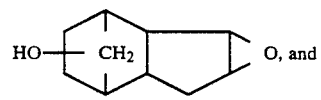

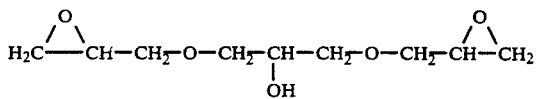

These compounds can be used singly or in combination.

In general, these components (a), (b) and (c) of composition (A) are simultaneously mixed under heating at 80° to 200° C. for 0.5 to 24 hours. Where a compound of component (c) alone is added to a polymaleimide resin of component (a), the mixture is gelled by the heating, e.g., at 120° C., for a short time. However, a further addition of component (b) in the mixing step under heating permits preparation of a uniform and stable solventless composition (A) which is liquefied under temperatures ranging between room temperature and about 80° C.

It is desirable to add component (c) in an amount of 15 to 1,000 parts by weight relative to 100 parts by weight of component (a) of polymaleimide resin. More desirably, the amount of component (c) should be 20 to 70 parts by weight in order to enable the composition to retain a high heat-resisting property and to prevent precipitation occurrence.

The amount of component (b) of epoxy resin should desirably be at least 10 parts by weight relative to 100 parts by weight of component (a) of polymaleimide resin in order to enable the composition to retain a satisfactory heat-resisting property. In general, component (b) should be added in an amount of 10 to 1,000 parts by weight. Particularly, the amount of component (b) of epoxy resin should be 15 to 100 parts by weight in view of the storage stability and heat resistance of the composition.

Components (a), (b) and (c) should desirably be mixed under heating at 80° to 200° C., particularly, at 110° to 150° C. The heating time should desirably be 0.5 to 24 hours, particularly, 1 to 6 hours. The mixing under these conditions permits preparation of a satisfactory composition (A).

A polyamine compound acting as a hardener is used as component (B) in the present invention. The general polyamine compounds, which are liquid or solid, can be used in the present invention including, for example, m- or p-phenylene diamine, 4,4'-diamino diphenyl methane, 4,4'-diamino phenyl sulfide, 4,4'-diamino diphenyl sulfone, 4,4'-diamino benzophenone, and m- or p-xylylene diamine. These polyamine compounds can be used singly or in combination. Also, the polyamine compounds used in the present invention are not restricted to those exemplified above.

The polyamine compound of component (B) preferably be used in an amount of 5 to 200 parts by weight, more preferably, 10 to 50 parts by weight, relative to 100 parts by weight of composition (A).

A mixture of composition (A) and component (B) is subjected to a thermal curing preferably at 80° to 250° C., more preferably, at 150° to 230° C. so as to obtain a desired heat-resistant resin composition. The heating time preferably be 0.5 to 24 hours, more preferably, 1 to 6 hours.

For promoting the curing of the composition of the present invention, it is possible to add at least one of tertiary amines, peroxides, imidazoles, etc., as desired.

It is also possible to add inorganic fillers in an attempt to lower the coefficient of shrinkage, coefficient of thermal expansion in the curing step, and to improve the abrasion resistance, mechanical strength, thermal conductivity, electrical conductivity, etc. of the composition.

Further, it is possible to add at least one of silicone resin, various liquid rubbers, prepolymer of diallylphthalate, phenoxy resin and phenol resin in order to improve the toughness and flexibility of the composition without impairing the object of the present invention.

Still further, in order to lower the viscosity, it is possible to add to composition (A) a compound which stops the reaction halfway the reaction process or which does not perform reaction at room temperature, though the addition of the particular compound should not impair the heat-resisting property of the final composition of the present invention. The particular compound noted above includes, for example, allyl alcohol, furfuryl alcohol, divinylbenzene, vinyl toluene, styrene, N-vinyl pyrolidone, triallyl trimellitate, triallyl isocyanurate, triallyl cyanurate, diallyl phthalate monomer, and various acrylates and various methacrylates. These compounds can be used singly or in combination. In the case of adding allyl alcohol or furfuryl alcohol among the compounds noted above, it is possible to somewhat decrease the amount of component (c) of composition (A). If allyl alcohol and/or furfuryl alcohol are substituted for all of component (c), however, it is impossible to prevent precipitation.

It should be noted that, if polymaleimide and epoxy resin are mixed under a high temperature, e.g., 150° C., the mixture is liquefied uniformly. However, when cooled to room temperature, a large amount of precipitation tends to take place. The precipitation can be suppressed by adding polyamine to the system. A prepolymer having an amino group is formed by Michael addition reaction between polymaleimide and a compound having an active hydrogen such as polyamine. The prepolymer thus formed is considered to react with the epoxy resin so as to present a homogeneous state. On the other hand, a mixture of polymaleimide and epoxy resin is melted at 150° C. When cooled to room temperature, however, precipitation of polymaleimide is considered to take place because the polymaleimide is not strongly bonded to the epoxy resin.

In conclusion, the present invention utilizes the Michael addition reaction involving polymaleimide and the fact that epoxy resin is unlikely to react with polymaleimide. Based on this technical idea, a compound having a OH group and an epoxy group are reacted with polymaleimide in the present invention so as to permit the reaction to stop under the state of a relatively low molecular weight and, thus, to improve the compatibility. The prepolymer of composition (A) thus obtained is cured by polyamine of component (B) so as to provide a heat-resistant resin composition high in workability and storage stability.

EXAMPLES 1, 2 AND COMPARATIVE EXAMPLES 1–6:

Used in Examples 1 and 2 are composition (A) and component (B) shown in Table 1. Composition (A) was prepared by reacting the components shown in Table 1 within an autoclave at 130° C. for 2 hours. Special operations such as nitrogen gas substitution and pressurizing were quite unnecessary during the reaction. As shown in Table 1, composition (A) was obtained as a uniform liquid reaction product in Examples 1 and 2. In Comparative Examples 1–4. composition (A) was prepared substantially as in Examples 1 and 2 except for the following. Specifically, in Comparative Example 1, component (b) was not contained in composition (A). In each of Comparative Examples 2 and 3, component (c) was not contained in composition (A). Further, in Comparative Example 4, a reactive monomer of diallylphthalate monomer was used in place of component (c) of composition (A). It has been found that lack of any of components (b) and (c) results in failure to obtain a uniform reaction product as composition (A). Incidentally, component (b) alone was used as composition (A) in each of Comparative Examples 5 and 6. In Examples 1 and 2 and Comparative Examples 5 and 6, a mixture of composition (A) and component (B) was hardened at 200° C. for 1.5 hours. Table 1 shows the glass transition point Tg [measured by TMA (thermomechanical analysis) method] of the cured compositions.

Table 2 shows the storage stability of the resin composition obtained in Examples 1 and 2. As apparent from Table 2, the resin composition of the present invention can be sufficiently used at room temperature. In addition, the composition can be used sufficiently even three months later.

A mixture of composition (A) and component (B) was cured at 180° C. for 3 hours in each of Examples 1, 2 and Comparative Examples 5, 6, and the cured composition was exposed at 180° C. for 1 month and 2 months. Table 3 shows the tensile shear strength of the cured and exposed cured compositions measured at room temperature and at 180° C. The tensile shear strength was measured by the method of JIS (Japanese Industrial Standard) K6850. In Comparative Examples 5 and 6, deterioration was recognized 2 months later, though no deterioration was recognized in Examples 1 and 2 of the present invention. This indicates that the composition of the present invention exhibits an excellent heat-resisting property in addition to a high class transition point Tg.

TABLE 1

|  | Example | | Comparative Example | | | | | |
|---|---|---|---|---|---|---|---|---|
|  | 1 | 2 | 1 | 2 | 3 | 4 | 5 | 6 |
| Composition A (main components) (parts by weight) | | | | | | | | |
| 4,4'-diphenyl-methane bismaleimide | 143 | 143 | 143 | 143 | 143 | 143 | — | — |
| Glycidol | 74 | 74 | 60 | — | — | — | — | — |
| Epikote 828[1] | — | 46 | — | 46 | 46 | 46 | 100 | 100 |
| Epiclon 830[2] | 46 | 46 | — | — | 46 | 46 | — | — |
| ERL-4221[3] | 46 | — | — | 46 | — | — | — | — |
| Diallylphthalate monomer | — | — | — | — | — | 74 | — | — |
| State of 20° C. after reaction at 130° C. for 2 hours | * | * | ** | *** | *** | *** | — | — |
| Component B (Hardening agent) (parts by weight) | | | | | | | | |
| Ancamine SRX[4] | 108 | 108 | — | — | — | — | 35 | — |
| 4,4'-diaminodiphenyl methane | — | — | — | — | — | — | — | 27 |
| Tg (TMA method)[5] (°C.) | 188.9 | 186.9 | — | — | — | — | 171.1 | 163.3 |

Notes:
[1]Epoxy resin manufactured by Yuka Shell Epoxy Company Limited
[2]Epoxy resin manufactured by DAINIPPON INK & CHEMICALS INC.
[3]Epoxy resin manufactured by Union Carbide Japan
[4]Polyamine manufactured by ACI Japan Limited
[5]Cured at 200° C. for 1.5 hours
*Homogeneous liquid;
**Gelation;
***Precipitation occurrence

TABLE 2

| Viscosity (CPS) of Composition (A) under storage at 20° C. | | | |
|---|---|---|---|
|  | Immediately after storage | 1 month later | 3 months later |
| Example 1 | 19,000 | 28,000 | 36,000 |
| Example 2 | 28,000 | 37,000 | 46,000 |

TABLE 3

| | Tensile Shear Strength (Kgf/cm²)* | | | | | |
|---|---|---|---|---|---|---|
| Curing and Exposing Condition | 180° C. 3 hours | | 180° C. one month | | 180° C. two months | |
| Measuring Temp. | 20° C. | 180° C. | 20° C. | 180° C. | 20° C. | 200° C. |
| Example 1 | 190 | 180 | 150 | 200 | 155 | 200 | 205 |
| Example 2 | 170 | 185 | 195 | 240 | 190 | 245 | 245 |
| Comparative Example 5 | 160 | 150 | 155 | 190 | 145 | 175 | 120 |
| Comparative Example 6 | 220 | 130 | 195 | 165 | 190 | 140 | 90 |

*S55C steel plate was used as adherend

The heat-resistant resin composition of the present invention exhibits a good storage stability, unlike the heat-resistant resin modified by the various conventional methods with polymaleimide. Also, the composition of the present invention is a solventless liquid having a viscosity lowered to a level of the general liquid epoxy resin and can therefore be applied to more uses than the conventional composition. Further, the resin composition of the present invention exhibits a good workability and is soluble in the general-purpose solvents such as acetone, methyl ethyl ketone and toluene, making it possible to sufficiently lower the viscosity for use in, for example, the substrate of a printed circuit. Also, the pot life control for use in this field can be facilitated.

The glass transition point Tg (measured by TMA method) of the heat-resistant resin composition of the present invention can be elevated by decreasing the amount of epoxy resin or by using a polyfunctional epoxy resin. In this case, however, the viscosity of the resin composition is increased. Thus, it is desirable to make the composition solvent type in some cases. The solvent type composition is superior to the solventless type in the storage stability. Further, it is possible to use polymaleimide in a variety of modified forms in the heat-resistant resin composition of the present invention. It follows that the composition can be widely used for manufacturing, for example, adhesives, casting articles, laminated materials, encapsulant etc. requiring a high heat-resisting property.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. A heat-curable two-part heat-resistant resin composition comprising (A) a resin composition as a first part and (B) polyamine hardener as a second part, said composition (A) being prepared by heating a mixture of component (a) maleimide resin represented by a general formula:

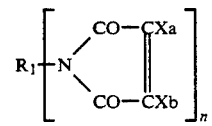

where R' is an organic group having a valency of n, Xa and Xb are the same or different monovalent atoms or groups selected from the group consisting of hydrogen atom, halogen atom and organic group, and n is an integer of 1 to 4, component (b) an epoxy resin having at least two epoxy groups in the molecule and component (c) a compound having one alcoholic or phenolic OH group and at least one epoxy group in the molecule with the proviso that component (b) excludes the compound of component (c), to effect a Michael addition reaction between components (a) and (c).

2. The heat-resistant resin composition according to claim 1, which further comprises at least one compound selected from the group consisting of tertiary amines, peroxides and imidazoles.

3. The heat-resistant resin composition according to claim 1, which further comprises an inorganic filler.

4. The heat-resistant resin composition according to claim 1, wherein component (a) of maleimide contained in composition (a) is at least one compound selected from the group consisting of hexamethylene bismaleimide, 4,4'-diphenylether bismaleimide, m- and p-phenylene bismaleimide, 4,4'-dicyclohexyl methane bismaleimide, 4,4'-diphenylene bismaleimide, 4,4'-diphenylsulfone bismaleimide, m- and p-xylylene bismaleimide, 4,4'-diphenylmethane bismaleimide, trinuclides thereof and tetranuclides thereof.

5. The heat-resistant resin composition according to claim 1, wherein the compound of component (c) contained in composition (A) is at least one compound selected from the group consisting of

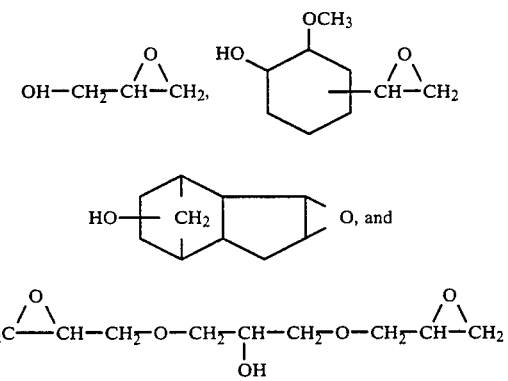

6. The heat-resistant resin composition according to claim 5, wherein component (a) of maleimide contained in composition (A) is at least one compound selected from the group consisting of hexamethylene bismaleimide, 4,4'-diphenylether bismaleimide, m- and p-phenylene bismaleimide, 4,4'-dicyclohexyl methane bismaleimide, 4,4'-diphenylene bismaleimide, 4,4'-diphenylsulfone bismaleimide, m- and p-xylylene bismaleimide, 4,4'-diphenylmethane bismaleimide, trinuclides thereof and tetranuclides thereof;

component (b) of epoxy resin contained in composition (A) is at least one material selected from the group consisting of bisphenol A epoxy resin, bisphenol F epoxy resin, novolak epoxy resin, epoxy resin consisting of a glycidylated amine, polyglycidyl ether of polyol, epoxy resin having a heterocyclic ring, aliphatic epoxy resin other than the polyglycidyl ether of polyol and alicyclic epoxy resins;

component (B) of polyamine is at least one compound selected from the group consisting of m- and p-phenylene diamine, 4,4'-diamino diphenyl methane, 4,4'-diamino phenyl sulfide, 4,4'-diamino diphenyl sulfone, 4,4'-diamino benzophenone, and m- and p-xylylene diamine;

component (c) in composition (A) is used in an amount of 15 to 1,000 parts by weight relative to 100 parts by weight of component (a) of polymaleimide resin in composition (A);

component (b) of epoxy resin in composition (A) is used in an amount of 10 to 1,000 parts by weight relative to 100 parts by weight of component (a) of polymaleimide resin in composition (A);

component (B) of polyamine is used in an amount of 5 to 200 parts by weight relative to 100 parts by weight of composition (A); and the mixture of components (a), (b), (c) of composition (A) is heated at 80° to 200° C. for 0.5 to 24 hours.

7. The heat-resistant resin composition according to claim 6, wherein component (c) in composition (A) is used in an amount of 20 to 70 parts by weight relative to 100 parts by weight of component (a) of maleimide resin in composition (A);

component (b) of epoxy resin in composition (A) is used in an amount of 15 to 100 parts by weight relative to 100 parts by weight of component (a) of polymaleimide resin in composition (A);

component (B) of polyamine is used in an amount of 10 to 50 parts by weight relative to 100 parts by weight of composition (A); and the mixture of components (a), (b), and (c) of composition (A) is heated at 100° to 150° C. for 1 to 6 hours.

8. The heat-resistant resin composition according to claim 1, wherein component (B) of polyamine is at least one compound selected from the group consisting of m- and p-phenylene diamine, 4,4'-diamino diphenyl methane, 4,4'-diamino phenyl sulfide, 4,4'-diamino diphenyl sulfone, 4,4'-diamino benzophenone, and m- and p-xylylene diamine.

9. The heat-resistant resin composition according to claim 1, wherein the compound of component (c) in composition (A) is used in an amount of 15 to 1,000 parts by weight relative to 100 parts by weight of component (a) of maleimide resin in composition (A).

10. The heat-resistant resin composition according to claim 1, wherein the compound of component (c) in composition (A) is used in an amount of 20 to 70 parts by weight relative to 100 parts by weight of component (a) of maleimide resin in composition (A).

11. The heat-resistant resin composition according to claim 1, wherein component (b) of epoxy resin in composition (A) is used in an amount of 10 to 1,000 parts by weight relative to 100 parts by weight of component (a) of maleimide resin in composition (A).

12. The heat-resistant resin composition according to claim 1, wherein component (b) of epoxy resin in composition (A) is used in an amount of 15 to 100 parts by weight relative to 100 parts by weight of component (a) of maleimide resin in composition (A).

13. The heat-resistant resin composition according to claim 1, wherein component (B) of polyamine is used in an amount of 5 to 200 parts by weight relative to 100 parts by weight of composition (A).

14. The heat-resistant resin composition according to claim 1, wherein component (B) of polyamine is used in an amount of 10 to 50 parts by weight relative to 100 parts by weight of composition (A).

15. The heat-resistant resin composition according to claim 1, wherein a mixture of components (a), (b), (c) of composition (A) is heated at 80° to 200° C.

16. The heat-resistant resin composition according to claim 1, wherein a mixture of components (a), (b), (c) of composition (A) is heated at 110° to 150° C.

17. The heat-resistant resin composition according to claim 17, wherein a mixture of components (a), (b), (c) of composition (A) is heated for 0.5 to 24 hours.

18. The heat-resistant resin composition according to claim 18, wherein a mixture of components (a), (b), (c) of composition (A) is heated for 1 to 6 hours.

19. A heat-curable two-part heat-resistant resin composition comprising (A) a resin composition as a first part and (B) polyamine hardener as a second part, said composition (A) being prepared by heating a mixture of component (a) maleimide resin represented by a general formula:

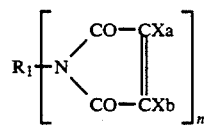

where $R^1$ is an organic group having a valency of n, Xa and Xb are the same or different monovalent atoms or groups selected from the group consisting of hydrogen atom, halogen atom and organic group, and n is an integer of 1 to 4, component (b) an epoxy resin having at least two epoxy groups in the molecule and component (c) a compound having one alcoholic or phenolic OH group and at least one epoxy group in the molecule with the proviso that component (b) excludes the compound of component (c), to effect a Michael addition reaction between components (a) and (c), and wherein component (b) of epoxy resin contained in composition (A) is at least one material selected from the group consisting of bisphenol A epoxy resin, bisphenol F epoxy resin, novolak epoxy resin, epoxy resin consisting of a glycidylated amine, polyglycidyl ether of polyol, epoxy resin having a heterocyclic ring, aliphatic epoxy resin other than the polyglycidyl ether of polyol and alicyclic epoxy resin.

* * * * *